Jan. 26, 1971  E. J. SPALDING  3,557,465
DEVICES FOR USE WHEN SETTING MACHINE TOOLS
Filed Dec. 11, 1968
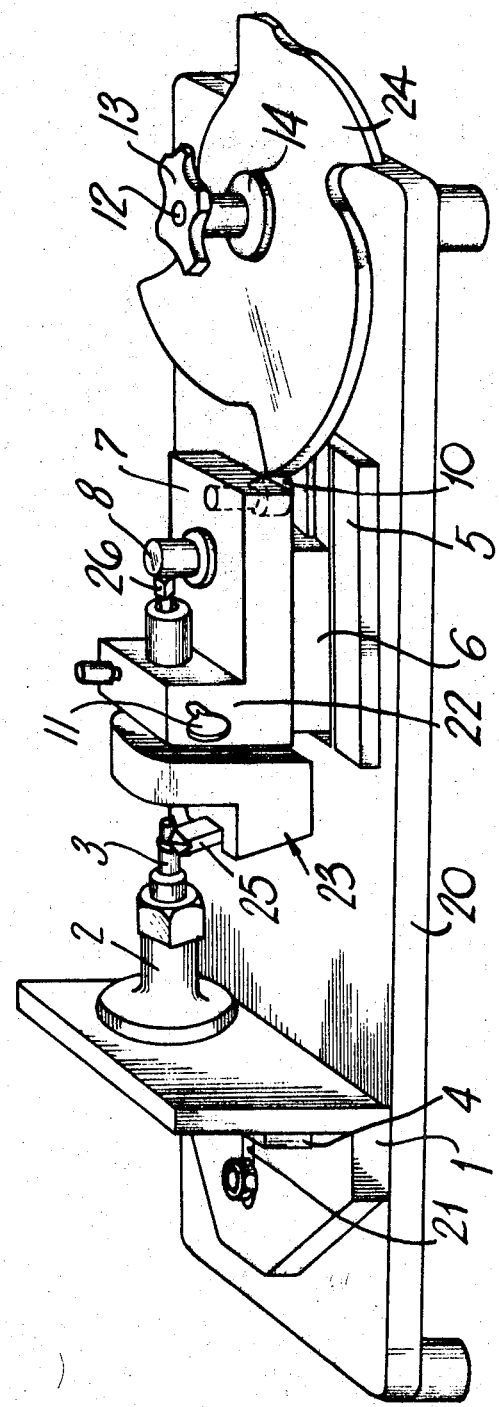
INVENTOR
Edwin James Spalding
BY
ATTORNEYS

United States Patent Office 3,557,465
Patented Jan. 26, 1971

3,557,465
DEVICES FOR USE WHEN SETTING MACHINE TOOLS
Edwin James Spalding, Uxbridge, Middlesex, England, assignor to C.A.V. Limited, London, England, a British company
Filed Dec. 11, 1968, Ser. No. 783,011
Claims priority, application Great Britain, Dec. 22, 1967, 58,402/67
Int. Cl. B27g 23/00
U.S. Cl. 33—185      4 Claims

ABSTRACT OF THE DISCLOSURE

A device for use when setting up automatic machine tools and in particular for facilitating the positioning of a cutting tool within a holder, in which the device is provided with a face plate having means for holding a replica of the component to be machined. A tool carrier is movable towards and away from the face plate, and has means for mounting a tool holder thereon. A pin carries a cam which cam engage a cam holder on said tool carrier to effect movement of the tool carrier towards the face plate as the cam is rotated and a datum peg on the carrier for engagement by the tool holder or an adjustable part thereof.

---

This invention relates to a device for use when setting up automatic machine tools and in particular to a device for facilitating the positioning of cutting tool bits within holders respectively prior to the assembly and fine adjustment of the latter upon the machine tool.

When setting up a machine tool such for instance as a capstan lathe or an automatic lathe having a variety of cutting tools, it is a laborious operation setting the tools in situ on the machine tool and in addition valuable machine time is lost. A great deal of time and effort can be saved if the cutting tool bits are at least roughly positioned within their holders respectively and adjustment of the latter partly effected before being assembled to the machine tool and it is an object of the invention to provide a device for achieving this object in a simple and convenient form.

A device in accordance with the invention comprises in combination, a face plate, means on the face plate for holding a replica of the workpiece to be machined, a tool carrier movable towards and away from the face plate, said tool carrier having means for mounting a tool holder thereon, a pin, a cam adapted to be mounted on the pin, a cam follower on said tool carrier for engagement with said cam to effect movement of the tool carrier towards the face plate as the cam is rotated, and a datum peg on the carrier for engagement by the tool holder or an adjustable part thereof.

One example of a device in accordance with the invention will now be described with reference to the accompanying perspective drawing. Referring to the drawing there is provided a base plate 20 upon which is mounted a face plate 1 having a support portion situated at right angles thereto. The support portion of the face plate is provided with a slot 21 through which freely passes a stud secured to the base plate. The stud is engaged by a nut to provide clamping of the face plate relative to the base plate and the alignment of the face plate relative to the base plate is achieved by an elongated tenon connection (not shown). The face of the face plate remote from the support portion thereof has mounted thereon a collet 2 in which can be mounted a replica 3 of the workpiece to be machined. In order to accurately locate the replica it is provided with an elongated support portion which bears against a reference bar 4 secured on the remote face of the face plate.

Also provided is a slide support 5 upon which is mounted a slide 6 movable towards and away from the face plate. The slide supports a tool carrier 7 and the latter is movable relative to the slide 6 about a vertical axis defined by a datum peg 8. The tool carrier includes a vertically disposed portion 22 in which is formed an aperture for the reception of the shank of a tool holder indicated generally at 23. In order to retain the tool carrier relative to the slide 6 and in the position in which it is indicated in the drawing, a removable pin 9 is provided and for retaining the tool holder 23 relative to the tool carrier 7 a clamping screw 11 is provided.

Upstanding from the base plate 20 on the remote side of the tool carrier from the face plate 1 is a pin or tubular member 12 having its upper portion threaded and engaged by a clamping nut 13. The pin 12 is adapted to receive a cam 24 which may be the actual cam used for moving the tool holder when it is mounted in the machine tool or it may be an exact replica of this cam. Intermediate the clamping nut and the cam is a friction washer 14. Mounted on the tool carrier is a cam follower 10 for engagement with the periphery of the cam 24 and the tool carrier is biased by means of a spring (not shown) so that the follower 10 contacts the periphery of the cam.

The holder 23 in known manner supports, a cutting tool bit 25 which is adjustably mounted within the holder. The shank of the holder incorporates an adjustable distance screw 26 and it is this screw in relation to the holder 23 and the cutting tool bit 25 in relation to the holder 23 which have to be roughly adjusted prior to the insertion of the holder into the support of the machine tool.

When setting the cutting tool bit it is essential to first ensure that the device is equivalent to the machine tool in which the cutting bit and its holder will eventually be located. A machine tool has a workpiece holder and a tool carrying slide which during operation of the machine tool is moved towards the workpiece holder to effect machining of a workpiece carried by the holder. For moving the tool carrying slide, a cam is provided and it is convenient to set the device to be equivalent of the machine tool when the tool carrying slide of the machine tool is in its fully retracted position.

To use the device, the cam 24 is mounted about the pin 12 and the cam is moved angularly until the roller 10 is located at the lowest point of the cam. The workpiece is then inserted in the collet 2 and the face plate 1 is then adjusted relative to the base 20 so that the distance between the collet 2 and the tool carrier 7 is exactly equal to the distance between the tool carrying slide and the workpiece holder of the machine tool when the tool carrying slide is in its retracted position.

For convenience, the pin 9 is then withdrawn to permit angular movement of the tool carrier 7 about the datum peg 8 to allow easy assembly of the tool holder to the tool carrier. The adjusting screw 26 extends from the tool carrier by its minimum amount. The tool carrier 7 is then moved back into position and the pin 9 is reinserted. The cutting tool bit is adjusted relative to the tool holder so that the center height and the cutting diameter are correct, with this adjustment being effected either by using the workpiece or by some other means which forms no part of the instant invention.

The cam 24 is moved angularly until the roller 10 is on the crest of the appropriate cam lobe. During this movement, the tool carrier 7 moves to the position in which it is shown in the drawing. The clamping screw 11 is then slackened and the tool holder 23 is moved towards the collet 2 until the cutting edge of the cutting tool is located against the shoulder on the workpiece which in practice, and when the tool holder is mounted in the machine tool, will be formed by the cutting edge. The movement of the tool holder is achieved by the use of the adjusting screw 26 the head of which bears against the datum peg 8. When the adjustment has been carried out the tool holder 23 is removed from the tool carrier and is then ready for insertion into the machine tool. After the adjustment described above, the length of the tool holder or more correctly, the distance between the cutting edge of the cutting tool 25 and the head of the adjusting screw 26, is such that when the holder is inserted into the tool carrying slide of the machine tool, the cutting edge of the cutting tool will be correctly positioned so that the shoulder on the workpiece will be in the correct position. In order to locate the tool holder on the tool carrying slide of the machine tool, the latter is provided with a reference face which may be in the form of a temporary stop peg with which co-operates the head of the adjusting screw 26.

Having thus described my invention what I claim as new and desire to secure by Letters Patent is:

1. A device for use when positioning cutting tool bits within tool holders respectively to enable the holder and bit to be assembled to a cam actuated machine tool without the need for adjustment before using the machine tool to machine a workpiece, the device comprising in combination, a face plate, collet means on the face plate for holding a workpiece to be machined by the machine tool, a tool carrier movable towards and away from the face plate, means on said tool carrier for mounting a tool holder thereon, a pin mounted in spaced relation to the side of the tool carrier remote from the face plate, a cam adapted to be mounted on the pin, a cam follower on said tool carrier for engagement with said cam to effect movement of the tool carrier towards the face plate as the cam is rotated, said cam having a profile corresponding to the profile of the cam of the machine tool, and a datum peg on the carrier for engagement by the tool holder.

2. The device as claimed in claim 1 including a base plate, means adjustably mounting the face plate on the base plate, a slide mounted on the base plate, and means mounting the tool carrier on the slide to permit movement of the tool carrier towards and away from the face plate.

3. A device as claimed in claim 2 in which the means for holding the replica of the component comprises a collet.

4. A device as claimed in claim 3 in which the tool carrier is mounted for pivotal movement upon the slide to facilitate removal of the tool holder from the tool carrier.

References Cited

UNITED STATES PATENTS

| | | | |
|---|---|---|---|
| 3,224,104 | 12/1965 | Platt | 33—185 |
| 3,200,506 | 8/1965 | Jeanneret | 33—185 |
| 2,504,249 | 4/1950 | Bruce | 33—185 |

WILLIAM D. MARTIN, JR., Primary Examiner